June 29, 1943.   P. F. TRYON   2,322,958
PRODUCTION OF HYDROXYLAMMONIUM SULPHATE
Filed June 6, 1941
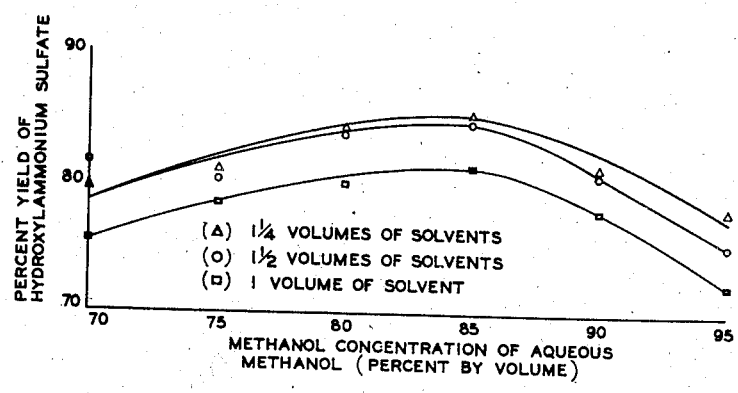
FIGURE I
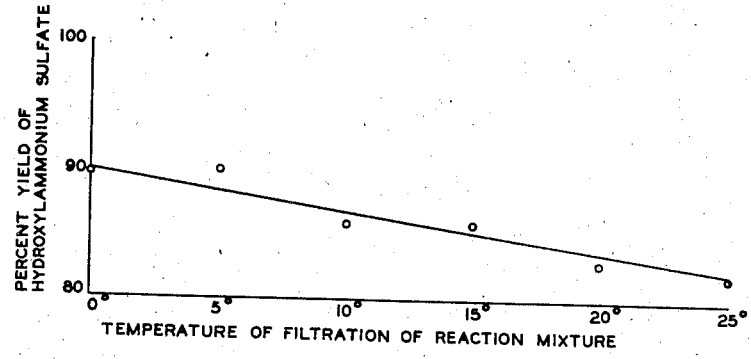
FIGURE II
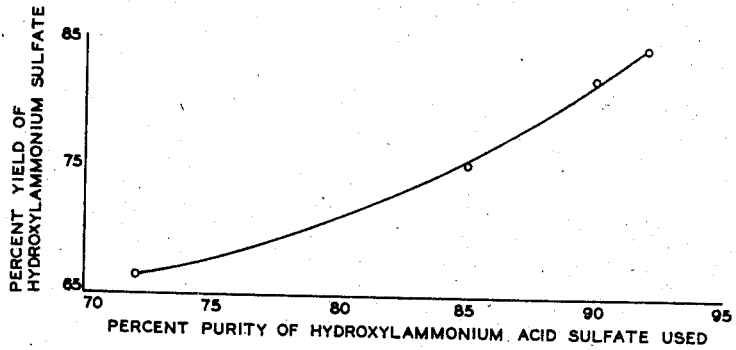
FIGURE III
INVENTOR Philip F. Tryon
ATTORNEY Patented June 29, 1943

2,322,958

UNITED STATES PATENT OFFICE 2,322,958

PRODUCTION OF HYDROXYLAMMONIUM SULPHATE

Philip F. Tryon, Terre Haute, Ind., assignor to Commercial Solvents Corporation, Terre Haute, Ind., a corporation of Maryland Application June 6, 1941, Serial No. 396,801

3 Claims. (Cl. 23—117)

The present invention relates to a novel process for the production of hydroxylammonium sulphate. More particularly, it concerns a process for obtaining substantially pure hydroxylammonium sulphate by treating hydroxylammonium acid sulphate, or crude solutions thereof, with an aqueous solution of methyl alcohol.

Hydroxylammonium acid sulphate is generally regarded as an equilibrium mixture consisting of hydroxylammonium sulphate, sulphuric acid, and hydroxylammonium acid sulphate, as may be illustrated by the following equation:

$$2(NH_2OH)HSO_4 \rightleftarrows (NH_2OH)_2SO_4 + H_2SO_4$$

If it is desired to obtain hydroxylammonium sulphate therefrom, it will obviously be necessary to treat the mixture in such a manner that the equilibrium is displaced toward the right. It will also be apparent that in order to attain this object, a reagent should be employed, which forms an insoluble substance with sulphuric acid, or which is a poor solvent for hydroxylammonium sulphate, and is either a good solvent for sulphuric acid, or is capable of forming a solution containing, or a compound with sulphuric acid which is a poor solvent for said hydroxylammonium sulphate.

In attempting to solve this problem, there have been numerous methods proposed, some of which have proved to be satisfactory when applied to small-scale operation. For example, hydroxylammonium sulphate has been obtained from hydroxylammonium acid sulphate by adding to an aqueous solution thereof sufficient calcium carbonate to exactly neutralize the excess sulphuric acid present in said aqueous solution. In carrying out this process, the precipitate of calcium sulphate, thus formed, is separated from the aqueous solution of hydroxylammonium sulphate by means of filtration, and the filtrate is then evaporated in order to obtain hydroxylammonium sulphate. The hydroxylammonium sulphate, thus secured, is generally only about 90 per cent pure, and must be dissolved and recrystallized from a suitable solvent in order to obtain the product in a substantially pure state. It is evident that the industrial application of such a process would entail the handling of excessive quantities of solutions, as well as the tedious and expensive operation of evaporating said solutions.

I have now discovered a method for securing hydroxylammonium sulphate from hydroxylammonium acid sulphate in a substantially pure state, and in consistently high yields, which comprises essentially treating hydroxylammonium acid sulphate or a crude solution thereof, with aqueous methanol to obtain crystalline hydroxylammonium sulphate in yields that are appreciably in excess of those obtainable by employing pure methanol. To secure hydroxylammonium sulphate in increased yields, in the form of a crystalline precipitate, by the addition of water to the methanol is entirely contrary to the results which would normally be expected in view of the fact that water itself is a good solvent for hydroxylammonium sulphate. Ordinarily it would be anticipated, under such circumstances, that the solvent power of such methanol solutions for hydroxylammonium sulphate would be substantially increased, rather than decreased. Based upon the discovery of the above phenomenon, a commercially practical method for converting hydroxylammonium acid sulphate into hydroxylammonium sulphate, has now been provided.

In accordance with my invention, hydroxylammonium acid sulphate, or a crude solution thereof, is slowly introduced into an aqueous methanol solution, and the mixture thoroughly agitated during the addition of said hydroxylammonium acid sulphate. As previously stated, the hydroxylammonium acid sulphate is thought to be composed of an equilibrium mixture consisting of hydroxylammonium sulphate, sulphuric acid, and hydroxylammonium acid sulphate. Upon contact with aqueous methanol, the sulphuric acid is dissolved therein to give a solution in which hydroxylammonium sulphate is substantially insoluble, thus displacing the equilibrium to the right until substantially all of the hydroxylammonium acid sulphate has been converted into hydroxylammonium sulphate. The hydroxylammonium sulphate, thus formed, being insoluble in the resulting medium, precipitates therefrom as a white, crystalline solid. It is then separated from said medium by first cooling the latter to approximately 25° C., and filtering under vacuum, after which the crystalline hydroxylammonium sulphate is washed with methanol, preferably in the form of an 85 per cent solution, and then dried for a period of from three to five hours at a temperature of from 50–60° C. The methanol employed in the reaction may be readily and substantially completely recovered from the filtrate by distillation. Thus, by distilling this mixture and recovering the methanol, the total volume thereof employed in carrying out my invention, remains relatively small, since the said methanol thus obtained may be reused for an indefinite period in the first step of my process. Also, the sulphuric acid remaining in the still residue may be recovered, and used as a reagent in the preparation of additional hydroxylammonium acid sulphate.

The process of the present invention is readily adapted to commercial application because of the relatively small operation costs. The present invention constitutes a further advantage over prior art methods in that it is capable of being effectively operated on a commercial scale without requiring the handling of undesirably large volumes of reagents.

In following the process of the present invention, particular attention should be given to the concentrations of the aqueous methanol solutions, as well as the relative volumes thereof employed. Likewise, the temperature at which the process is carried out, and the purity of hydroxylammonium acid sulphate employed, are additional factors which require careful attention in order that optimum results may be obtained.

The accompanying drawing is a detailed graphical representation illustrating the dependency of the successful operation of the present invention upon the factors referred to above.

The curves of Figure 1 represent the yields obtained by treating hydroxylammonium acid sulphate of 92 per cent purity with aqueous methanol solutions of varying concentrations and volumes. The concentrations and volumes of the methanol solutions, employed in carrying out my process, will be found to vary within certain limits, and in general it may be said that aqueous solutions consisting of from 75–90 per cent methanol, may be utilized. Otherwise stated, the water content of the reaction mixture should not appreciably exceed 15.5 per cent by weight, based upon the total weight of said mixture, and should constitute at least 4.3 per cent by weight of said mixture. Thus it will be apparent that although the hydroxylammonium acid sulphate employed in my process generally contains no water as an impurity, aqueous solutions of said hydroxylammonium acid sulphate may be utilized provided the water content thereof is such that the per cent by weight of water in the reaction mixture lies within the range specified above.

The desired volume to be employed for methanol solutions of given concentrations, may be readily ascertained by reference to Figure 1. As may be seen from a brief inspection of Figure 1, for a solution of given methanol concentration, the highest yields of hydroxylammonium sulphate are generally secured by the use of one and one-fourth volumes of aqueous methanol per volume of hydroxylammonium acid sulphate, although the yields secured when using from one and one-half to two volumes of solvent, are comparable to those obtained in the former case. It will also be evident, from Figure 1, that for a given relative volume of aqueous methanol, the highest yields of hydroxylammonium sulphate are secured with 85 per cent methanol. In terms of per cent by weight of water contained in the reaction mixture, this figure may vary from 6.4 to 9.45 per cent, depending of course upon whether one or two volumes of 85 per cent methanol per volume of hydroxylammonium acid sulphate have been employed.

Figure 2 illustrates the extent to which the filtration temperature affects the yield of hydroxylammonium sulphate. In obtaining the data used in constructing the curve of Figure 2, one and one-fourth volumes of 80 per cent methanol per volume of hydroxylammonium acid sulphate, the latter being of 90 per cent purity, was employed. The results show that the yield of hydroxylammonium sulphate, obtained by the treatment of hydroxylammonium acid sulphate with aqueous methanol, increases as the filtration temperature is decreased from 25° C. to 0° C. In all cases the purity of the hydroxylammonium sulphate obtained at the various temperatures listed in Figure 2, did not fall below 96 per cent, and in most instances was found to be of 98 per cent purity.

Figure 3 illustrates the effect of the purity of hydroxylammonium acid sulphate on the yields of hydroxylammonium sulphate. In obtaining the data for the construction of the curve in Figure 3, the general procedure, previously described for the preparation of hydroxylammonium sulphate, was employed. One and one-fourth volumes of 80 per cent methanol per volume of hydroxylammonium acid sulphate, was used, and the hydroxylammonium sulphate thus formed, was filtered at a temperature of 25° C. From the results shown, it will be apparent that as the purity of the hydroxylammonium acid sulphate increases, the yield of hydroxylammonium sulphate also increases. Obviously, therefore, for optimum results, it will be desirable to use hydroxylammonium acid sulphate of the highest purity that is practically possible.

In this connection, I have found that hydroxylammonium acid sulphate is readily obtainable in large quantities, and in a substantially anhydrous and relatively pure state, as one of the principal products of the process described in U. S. Pat. No. 2,113,812 to S. B. Lippincott. According to this reference, aliphatic monocarboxylic acids, together with a substantial quantity of hydroxylammonium acid sulphate, are readily obtained by reacting a primary nitroparaffin with approximately an equimolecular quantity of sulphuric acid in the presence of at least one mole of water per mole of nitroparaffin. At the conclusion of the reaction period, two distinct layers are observed, the upper layer consisting of aliphatic monocarboxylic acid, unreacted nitroparaffin, and a small quantity of sulphuric acid, while the lower layer is found to be composed principally of hydroxylammonium acid sulphate, together with relatively small amounts of ammonium hydrogen sulphate, sulphuric acid, and aliphatic monocarboxylic acid. The lower layer may be drawn off by any convenient means, and immediately used in the process of the present invention, without further purification. The hydroxylammonium acid sulphate, obtained in the lower layer, is present therein in the form of a substantially anhydrous super-cooled liquid, and is obtainable in a state of purity as high as 95 per cent, provided the starting materials employed in the above-mentioned reaction are sufficiently pure.

It will be evident, from the foregoing disclosure, that the present invention is subject to numerous modifications. For example, although it might be assumed from the above description that the present invention is applicable only to batch processes, it may be employed in continuous methods with equal success, by the use of obvious modifications. In general, it may be said that the present invention is intended to cover, by the terminology employed in the appended claims, all features of patentable novelty inherent therein. The compound hydroxyl-ammonium-sulphate which I form is more commonly known as hydroxylamine sulphate.

Having now described my invention, what I claim is:

1. In a process for the production of hydroxylammonium sulphate, the step which comprises introducing hydroxylammonium acid sulphate into an aqueous methanol solution, wherein the water content of the resulting mixture represents from about 4.3 to 15.5 per cent by weight of said mixture, and separating the resulting crystalline hydroxylammonium sulphate.

2. In a process for the production of hydroxylammonium sulphate, the step which comprises introducing hydroxylammonium acid sulphate into an aqueous methanol solution in a ratio of from about 1.25 to 1.50 volumes of said aqueous methanol solution per volume of hydroxylammonium acid sulphate, wherein the water content of the resulting mixture represents from about 4.95 to 13.0 per cent by weight of said mixture, and separating the resulting crystalline hydroxylammonium sulphate.

3. In a process for the production of hydroxylammonium sulphate, the step which comprises introducing hydroxylammonium acid sulphate into an aqueous methanol solution in a ratio of approximately 1.25 to 1.50 volumes of said aqueous methanol solution per volume of hydroxylammonium acid sulphate, wherein the water content of the resulting mixture represents approximately 7.6 to 8.8 per cent by weight of said mixture, and separating the resulting crystalline hydroxylammonium sulphate.

PHILIP F. TRYON.